F. W. LUTTS.
SAW-FILING MACHINE.
No. 169,912. Patented Nov. 16, 1875.
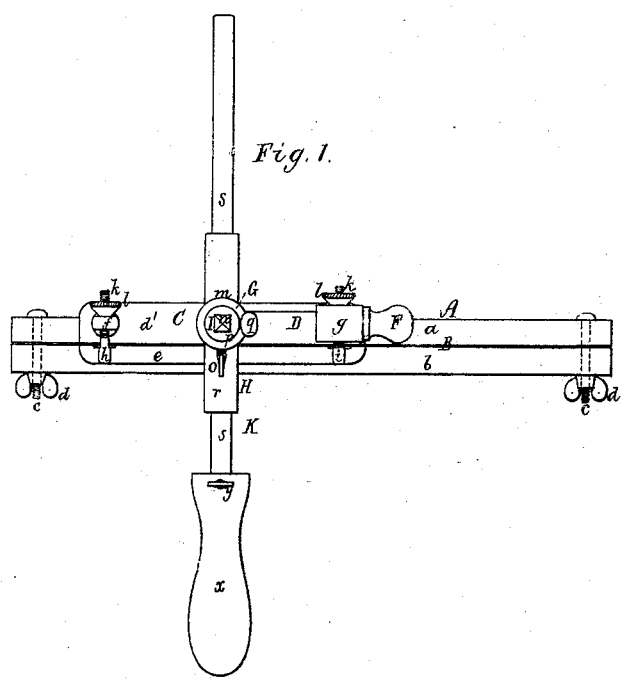
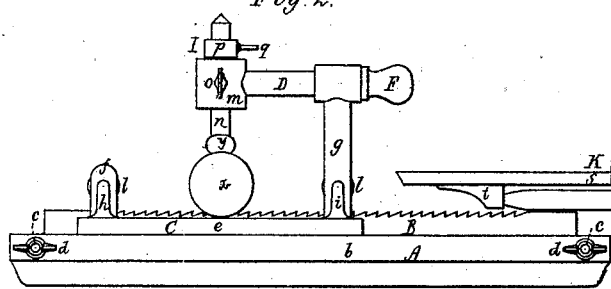 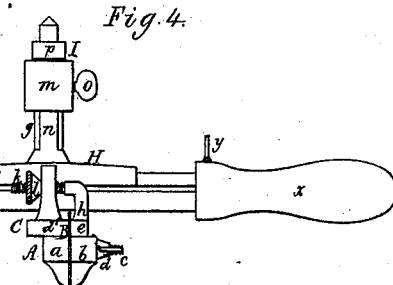
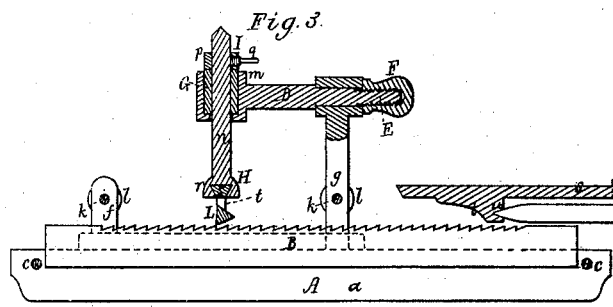 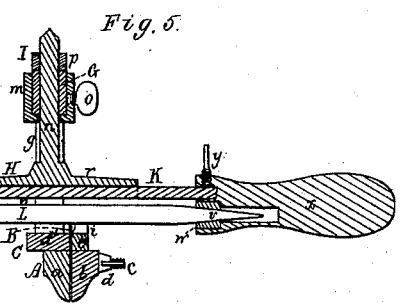
Witnesses.
Frank W. Lutts,
by his attorney

UNITED STATES PATENT OFFICE.

FRANK W. LUTTS, OF KITTERY, MAINE.

IMPROVEMENT IN SAW-FILING MACHINES.

Specification forming part of Letters Patent No. 169,912, dated November 16, 1875; application filed October 5, 1875.

*To all whom it may concern:*

Be it known that I, FRANK W. LUTTS, of Kittery, of the county of York and State of Maine, have invented a new and useful Improvement in Machines for Filing Saws; and do hereby declare the same to be fully described in the following specification and represented in the accompanying drawings, of which—

Figure 1 is a top view, Fig. 2 a front elevation, Fig. 3 a longitudinal section, Fig. 4 an end view, and Fig. 5 a transverse section, of a saw-filing machine embodying my invention.

With the said machine a saw may have its teeth successively filed to any desirable pitch and bevel, as the file-carrier support-piece may be adjusted to any necessary inclination to the horizon, and angle with reference to the saw. The file may also be turned more or less transversely, and fixed in its carrier, in order to obtain the desired pitch or inclination of the saw-tooth.

In the drawings, A denotes a clamp for holding a saw-blade, B, such clamp being composed of the two bars $a$ $b$, two screw-bolts, $c$ $c$, and two screw-nuts, $d$ $d$, all arranged as shown. Another or auxiliary and movable clamp, C, rests on the clamp A, and, like it, has two bars, $d'$ $e$. Upon each of the said bars two standards, $f g$ or $h i$, are erected, as shown, horizontal screws $k k$ being extended from one set, $h i$, through the other set, $f g$, of the said standards. These screws are provided with nuts, arranged as shown at $l$ $l$. By such screws and nuts the auxiliary clamp may be fastened to the saw, which is to extend up between and above the bars of the said clamp.

There is arranged in the longer standard $g$ of the clamp C a rotary arbor, D, provided with a screw, E, and a clamp-nut, F, thereto. The arbor is so applied to the standard as to be capable of being revolved transversely therein. The arbor terminates at its inner end in a cylindrical or barrel-shaped head, $m$, within which, concentrically, is a rotary sleeve, G, having a square or prismatic hole made axially through it, to receive the prismatic shank $n$ of a T-piece, H. There is to the head $m$ a set-screw, $o$, to clamp the sleeve in position.

The T-piece H, formed as shown, extends up through the sleeve, and is provided above it with an adjustable gage or stop, I, composed of a collar, $p$, and a clamp-screw, $q$, arranged therein, to work against the shank $n$. The base portion $r$ of the T-piece has in it a dovetailed groove, to receive the bar $s$ of the file-carrier K, which is dovetailed in transverse section, and is to slide lengthwise in the base. This bar or shank $s$ is furnished, near its outer end, with a projection or abutment, $t$, containing a conical recess, $u$, for reception of the head of a file, L. The tail or tang $v$ of the file is inserted in a rotary socket-piece, $w$, arranged, as shown, in the handle $x$ of the file-carrier. The shank $s$ also is inserted in the handle, and rests against the rotary socket-piece. A set-screw, $y$, screwed into the handle and against the shank, answers to clamp both the shank and the socket-piece in or to the handle.

From the above it will be seen that the rotary socket-piece allows of the adjustment of the file, to impart to a saw-tooth its proper rake or pitch; also, that the rotary arbor admits of the file-carrier being tipped into any desirable angle with the horizon. The sleeve of the arbor, at the same time, allows of the file-carrier being set to any desirable angle horizontally with the saw. It will also be seen that by means of the gage I the depth of cut of the file into the saw-blade may be determined.

Having adjusted the file and its carrier properly relatively to the saw-blade, a person has only to seize the carrier by its handle and move it longitudinally back and forth in the T-piece, with the file resting upon the saw.

In this way a tooth may be sharpened, or a notch for forming a tooth may be made in the blade.

Having completed, by the machine, the formation of a notch or the sharpening of a tooth, the auxiliary clamp is to be moved the necessary distance on the saw to admit of another tooth being sharpened or a notch made.

I claim—

The combination of the saw holder or clamp A, auxiliary clamp C, standard $g$, rotary arbor D, set-screw E, nut F, sleeve G, set-screw $o$, adjustable gage I, T-piece H, and the file-carrier K, all constructed, arranged, and applied substantially in manner and to operate as set forth.

FRANK W. LUTTS.

Witnesses:
R. H. EDDY,
J. R. SNOW.